May 18, 1965 L. A. LAITINEN 3,184,618
ELECTRIC CURRENT CONTROL APPARATUS
Filed March 20, 1961 3 Sheets-Sheet 1
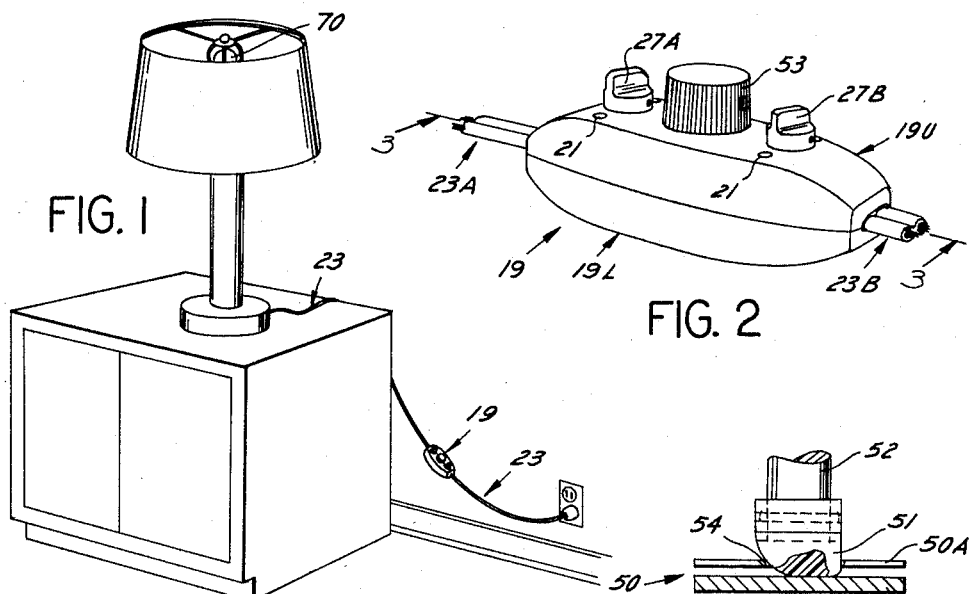
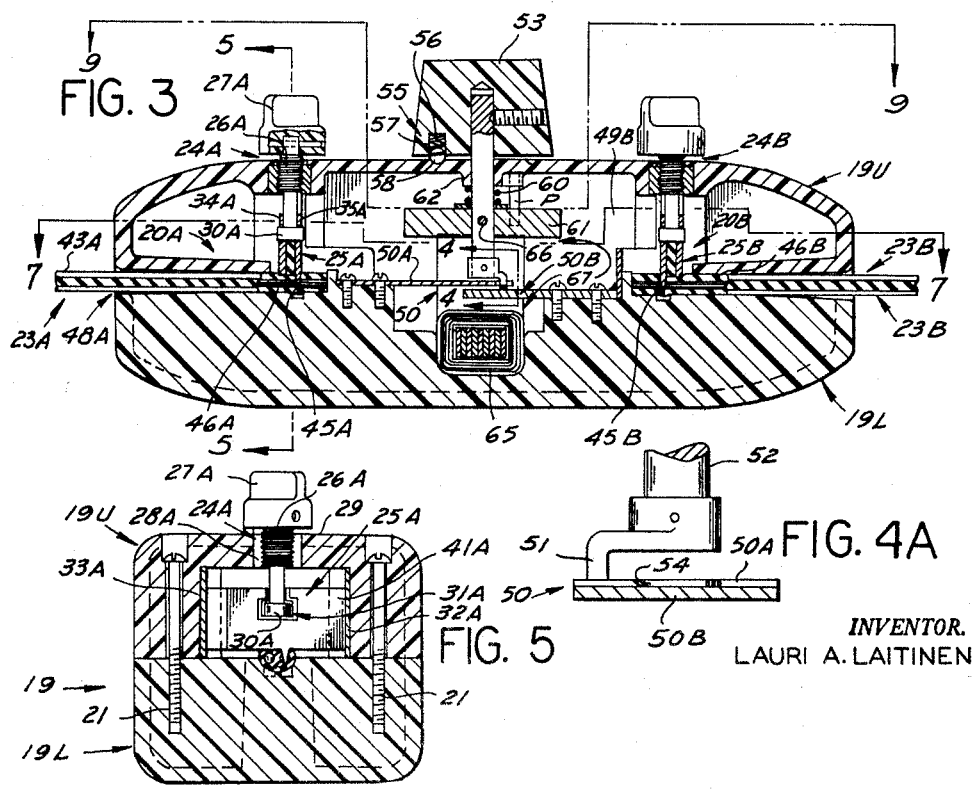
INVENTOR.
LAURI A. LAITINEN

INVENTOR.
LAURI A. LAITINEN

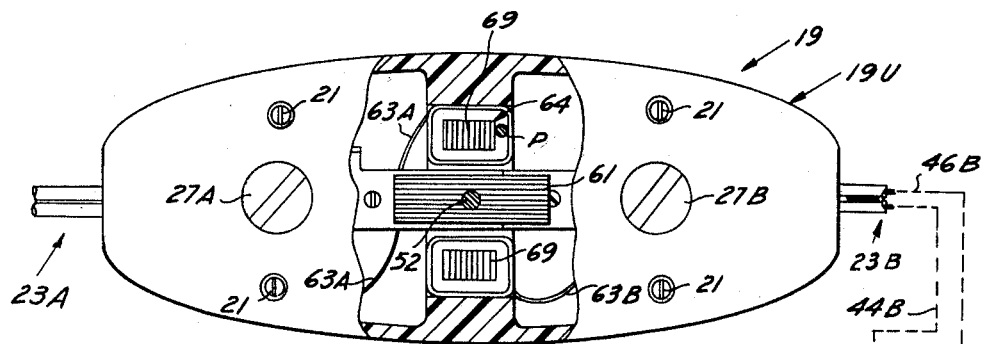
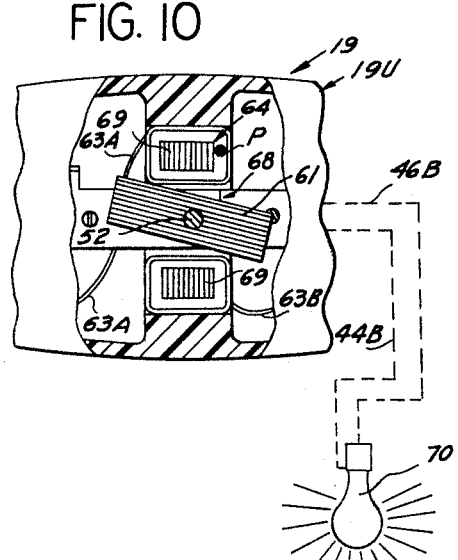
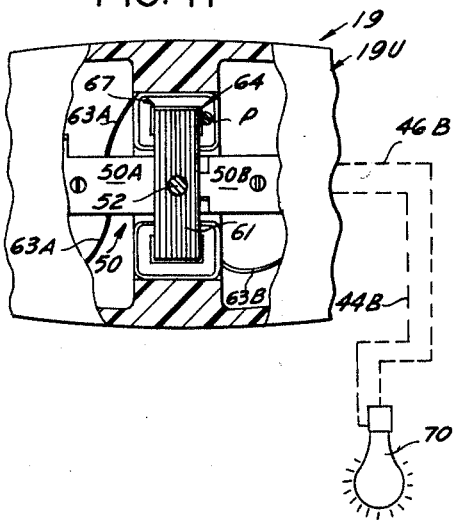
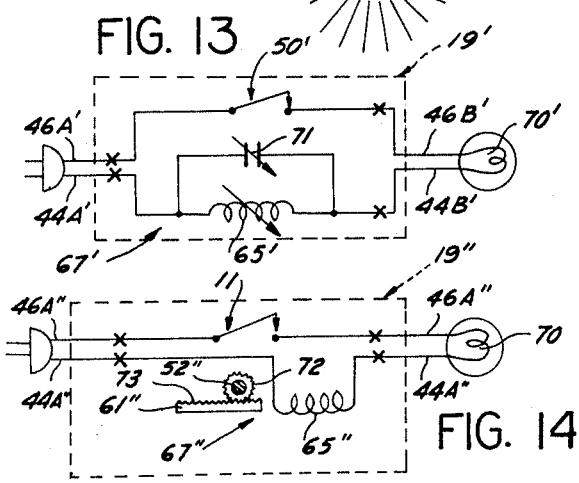
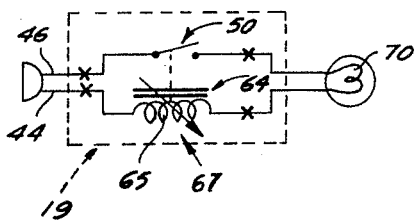
INVENTOR.
LAURI A. LAITINEN

United States Patent Office 3,184,618
Patented May 18, 1965

3,184,618
ELECTRIC CURRENT CONTROL APPARATUS
Lauri A. Laitinen, Palm Springs, Calif.
(34835 Ave. F, Yucaipa, Calif.)
Filed Mar. 20, 1961, Ser. No. 113,968
12 Claims. (Cl. 307—114)

The present invention comprises electric current control apparatus. In one specific form, it comprises a combination light switch and lighting intensity control apparatus adapted to be connected in electric wire means between a source of electric power and an electric lamp for convenient use in energizing and de-energizing the lamp and for controlling the intensity of the light produced thereby. The invention, in one preferred form, is also provided with novel wire-engaging means making it possible to quickly and easily attach the light switch and lighting intensity control apparatus in series with insulated electrical wire means by merely severing said insulated wire means and inserting the insulated severed end portions into the apparatus of the present invention for quick physical and electrical engagement by novel controllably operable wire-engaging means. This highly advantageous version eliminates the usual necessity of stripping the insulation from the electrical wire means for attachment to conventional electrical terminal means, and thus makes it possible to quickly mount the novel electric current control apparatus of the present invention in series with virtually any type of electrical extension cord so that the device can then be employed to open or close the circuit therethrough and/or to control alternating current flow therethrough.

It is an object of the present invention to provide apparatus of the character referred to above, which includes novel wire-engaging means adapted to make quick physical and electrical connection and disconnection with respect to an insulated two-wire electrical cord.

It is a further object to provide apparatus of the character referred to above, which includes novel, manually variable current-controlling means for controlling the flow of non-steady-state or alternating current therethrough.

It is a further object to provide apparatus of the character referred to above, which includes both novel wire-engaging means of the type referred to above and novel manually variable current-controlling means of the type referred to above for making quick connection to two-wire electrical cord means and for controlling alternating current flow therethrough.

It is a further object to provide apparatus of the character referred to in the preceding object, which includes switch means for effective opening and closing actuation whereby to allow or prevent current flow through the two-wire electrical cord means.

It is a further object to provide apparatus of the character referred to in the preceding object, wherein the switch means is physically coupled to and operated by an actuating member which also adjusts the current-controlling means whereby initial movement of said actuating means effectively operates said switch means, after which subsequent movement thereof effectively adjusts said current-controlling means.

Further objects are implicit in the detailed description which follows hereinafter for exemplary purposes and will be apparent to persons skilled in the art after a careful study thereof.

For the purpose of clarifying the nature of the present invention, several exemplary embodiments are illustrated in the hereinbelow-described figures of the accompanying three sheets of drawings and are described in detail hereinafter.

FIG. 1 is a reduced-size perspective view of one exemplary embodiment of the present invention in mounted relationship in a two-wire electrical cord which has one end connected by a wall plug to a wall outlet which is supplied with electric power, and which has another end connected to a lamp. In other words, this view shows the apparatus in a position for use in energizing the lamp, de-energizing the lamp, or controlling the current flow through the lamp and, therefore, the light produced thereby.

FIG. 2 is a somewhat larger-scale perspective view of the exemplary form of the invention shown in FIG. 1, with the attached portions of the two-wire electrical cord being shown broken away for space conservation reasons.

FIG. 3 is an enlarged sectional view taken in the direction of the arrows 3—3 of FIG. 2.

FIG. 4 is an enlarged fragmentary view, partly in elevation and partly broken away and in vertical section, taken generally in the direction of the arrows 4—4 of FIG. 3, and illustrates the detail of the exemplary form of energization switch operating means.

FIG. 4A is a view similar to FIG. 4, but shows the switch-actuating cam after it has been rotated into switch-closing position.

FIG. 5 is a cross-sectional view (with certain parts in elevation) taken in the direction of the arrows 5—5 of FIG. 3.

Figure 6:
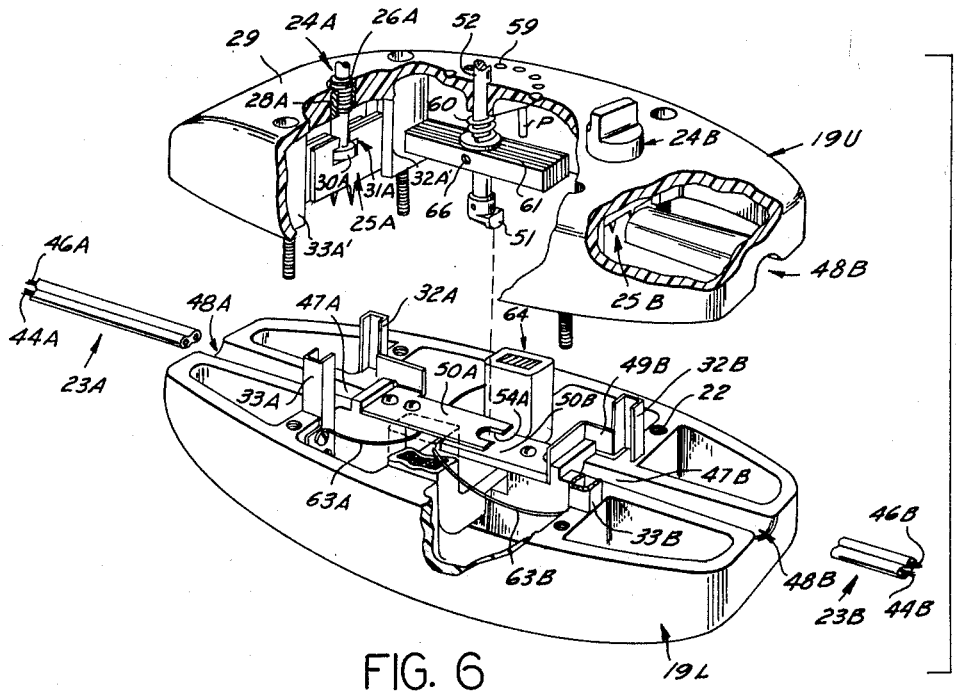

FIG. 6 is an exploded view illustrating the apparatus of FIG. 5 with the top and bottom portions thereof in exploded relationship and with the two severed-end portions of the two-wire electrical cord means being shown exploded longitudinally with respect to the wire-engaging means of the apparatus. This view has various portions broken away in order to facilitate full understanding of various structural details of this exemplary form of the invention.

Figure 7:
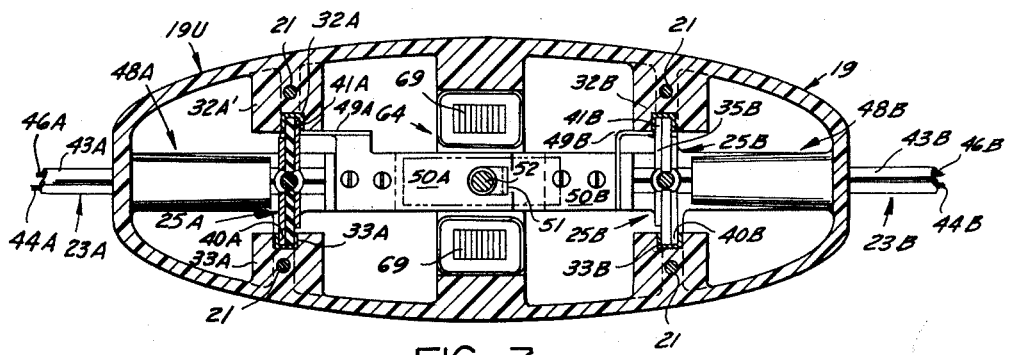

FIG. 7 is a staggered-plane view comprising a top plan view in part and a longitudinal sectional view in part. It is taken in the direction of the arrows 7—7 of FIG. 3.

Figure 8:
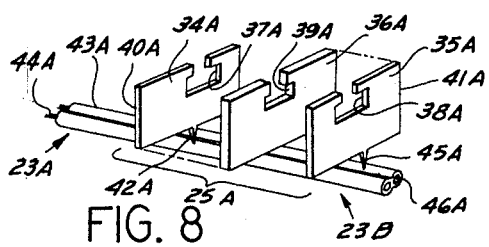

FIG. 8 is an exploded view of one of the slidably movable abutment means comprising a portion of one of the wire-engaging means for engagement with one severed end portion of the two-wire electrical extension cord. This view shows said slidable abutment means in exploded relationship before rigidly joining the three elements thereof together.

FIG. 9 is a staggered-plane, partially broken-away, top view taken along the plane indicated by the arrows 9—9 of FIG. 3 and illustrates the current-controlling means in a minimum impedance position. However, the energization switch means is open in this position, as best shown in FIG. 4, and, therefore, the lamp is de-energized.

FIG. 10 is a fragmentary view similar to the central portion of FIG. 9, but shows the apparatus after the actuating member or knob has been rotated in a clockwise direction, as viewed from above, through a few degrees such as to cause the energization switch means to be closed in a manner such as is best shown in FIG. 4A. This requires rotation of the current-controlling means through such a small number of degrees that it can still be said to virtually be in a minimum impedance position whereby to cause maximum light to be produced by the lamp.

FIG. 11 is a view similar to FIG. 10, but shows the apparatus after the current-controlling means has been further rotatably adjusted into a maximum impedance position whereby to reduce the light produced by the lamp to a minimum value.

FIG. 12 is an electrical schematic view of the form of the invention illustrated in FIGS. 1–11.

FIG. 13 is another electrical schematic view illustrating a modification of the first form of the invention shown schematically in FIG. 12.

FIG. 14 is another schematic view illustrating a further modification of the first form of the invention shown schematically in FIG. 12.

One exemplary embodiment of the invention is illustrated in FIGS. 1–12 and takes a typical exemplary form wherein it comprises a hollow housing, indicated generally at 19, made of an upper housing portion 19U and a lower housing portion 19L joined together by fastening means such as the screws 21 adapted to be threaded into tapped holes 22. The housing 19 is preferably made of molded plastic electrical insulating material such as phenolic resin or various other suitable materials.

The housing 19 is provided with controllably operable means for physically and electrically engaging insulated electrical wire means. In the specific example illustrated, there are two such wire-engaging means indicated generally at 20A and 20B (best shown in FIG. 3) each adapted to physically and electrically engage the corresponding severed end portions, indicated generally at 23A and 23B, of a two-wire electrical cord, indicated generally at 23 (best shown in FIG. 1).

In the specific example illustrated, each of the wire-engaging means 20A and 20B is of similar construction and consists of manually operable advancement means 24A and 24B, respectively, cooperable with corresponding abutment means 25A and 25B, respectively, for advancement into physical and electrical engagement with the corresponding end portions 23A and 23B, respectively, of the two-wire electrical cord 23. Since each of the two-wire-engaging means 20A and 20B is identical in construction, the left one shown in FIG. 3 at 20A will be described in detail, it being understood that this description is also applicable to the right one shown at 20B in FIG. 3. The manually operable advancement means 24A comprises a screw portion 26A having an actuating knob 27A carried at the top thereof, with the threaded portion 26A being threadedly engaged within a corresponding threaded bushing 28A carried in the top wall 29 of the upper housing section 19U. This provides an arrangement whereby rotation of the actuating knob 27A will vertically move the head 30A carried at the lower end of the screw 26A either upwardly or downwardly and will thereby correspondingly move, either upwardly or downwardly, the abutment means 25A which receives the head 30A in recess means 31A. The abutment means 25A is non-rotatably but vertically slidably mounted by means of the two electrically conductive channel members 32A and 33A mounted in corresponding channelled portions 32A' and 33A' of the upper housing portion 19U. This guides the upward and downward movement of the abutment means 25A.

In the specific form of the invention illustrated (as best shown in FIG. 8), the left abutment means 25A consists of a plate 34A of electrically conductive material, another plate 35A of electrically conductive material, and an intervening plate 36A of insulating material, with the two outer electrically conductive plates 34A and 35A having recess cutouts 37A and 38A of identical size and shape and with the intervening or central insulating plate 36A having a similarly shaped but smaller recess cutout 39A. The three plates 34A, 35A, and 36A are shown in exploded relationship in FIG. 8. However, it should be understood that they are adapted to be joined together in transversely aligned face-to-face abutment with all three of the recess cutouts 37A, 38A, and 39A in transverse alignment, although the central recess cutout 39A will project inwardly slightly because of its smaller size. This joining operation of the three plates 34A, 35A, and 36A may be accomplished in a variety of ways. However, one such mode of attachment is to adhesively join them together with a very strong adhesive or plastic material such as an epoxy resin, or the like, although not specifically so limited. In this joining operation, it should be noted that one end 40A of the electrically conductive plate 34A projects into a position for slidable and electrically conductive engagement with the channel member 33A. However, the opposite end of said plate 34A does not engage the other electrically conductive channel 32A. It should also be noted that one end 41A of the other electrically conductive plate 35A on the opposite end of the abutment means 25A from the end 40A projects outwardly into slidable electrically conductive engagement with the other electrically conductive channel 32A. The intervening insulating plate 36A engages both channel members 32A and 33A and electrically isolates the two electrically conductive plates 34A and 35A from each other.

The electrically conductive plate 34A has a piercing electric contact means or point 42A positioned for penetration through the insulation 43A of the two-wire cord portion 23A into physical and electrical contact with the elecrically conductive wire 44A therein. On the other hand, the other electrically conductive plate 35A has a differently positioned piercing electric contact means or point 45A positioned so as to penetrate the insulation 43A of the two-wire electric cord portion 23A and to physically and electrically engage the other electrically conductive wire 46A of the two-wire electrical cord portion 23A. The joined three plates 34A, 35A, and 36A, which together comprises the abutment means 25A, physically engage the outside of the insulation 43A of the two-wire electrical cord 23A in opposition to the bottom surface 47A of the wire-guiding inwardly converging support channel means 48A whereby to firmly hold the electrical cord portion 23A physically while electrically connecting the wire 46A to the electrically conductive channel 32A and while connecting the wire 44A to the electrically conductive channel 33A. This is best shown in FIGS. 3, 5, and 7. The electrically conductive channel member 32A is connected by an electrically conductive member 49A to an electrically conductive first switch element 50A, which is positioned vertically adjacent to but spaced from a second electrically conductive switch element 50B, which is connected by an electrically conductive member 49B to the similar electrically conductive channel member 32B at the right end of the device; said channel member 32B being connected by the electrically conductive plate 35B and the piercing electric contact point or means 45B to the wire 46B of the right hand two-wire electrical cord portion 23B. This provides connection of the electrical wires 46A and 46B through the normally open energization switch means indicated generally at 50 and including the two switch elements 50A and 50B, which are normally separated from each other but adapted to be closed by switch-operating cam means 51 carried by the rotary shaft means 52 connected to the actuating means or knob 53. Normally, when the switch 50 is in the open or de-energized position, the switch-operating cam means 51 lies in the cut-out 54 in the upper switch member 50A and, therefore, does not engage same. This is best shown in FIG. 4. However, upon rotation of the actuating knob 53, the cam 51 is rotated from the position shown in FIG. 4 into the position shown in FIG. 4A which also corresponds to the position of the apparatus as seen from another point of view in FIG. 10. This depresses the upper switch member 50A until it electrically engages the lower switch member 50B whereby to electrically close said switch means 50 and connect the wires 46A and 46B.

The actuating knob 53 is provided with means for retaining it in any selected adjusted position. In the specific form illustrated, said means is indicated generally at 55 and comprises spring means 56 in recess means 57 biasing retainer ball means 58 downwardly into any one of a plurality of semi-spherical recesses 59. This will retain the actuating knob 53 in any of a plurality of rotatively displaced positions. However, various other rotative positioning means may be employed or this feature of the invention may be eliminated entirely in certain modified forms. The shaft 52 is provided with compression biasing spring means 60 positioned between a rotary member 61 and the lower surface of the boss 62 lying under the top wall 29 of the upper housing portion 19U. This acts to bias the shaft 52 and the actuating knob 53 downwardly and facilitates the operation of the rotative movement-immobilizing or positioning means indicated generally at 55.

The other electrically conductive channel member 33A is connected by a wire 63A to one terminal of the windings of a substantially U-shaped ferromagnetic core means indicated generally at 64, which has its opposite terminal connected by a lead 63B to the other corresponding electrically conductive channel member 33B at the right end of the device, thus effectively connecting the wires 44A and 44B through the windings, indicated schematically in FIG. 12 at 65, of the ferromagnetic core means indicated generally at 64. This, together with the element 61 pinned by the pin means 66 to the shaft 52, effectively comprises current-controlling means of a type comprising variable impedance means adapted to vary the impedance presented to non-steady-state or alternating current flowing therethrough by way of the wires 44A and 44B. The entire device consisting of the core 64, the windings 65, and the rotatable member 61 effectively comprises said current-controlling or variable impedance means and is designated generally by the reference numeral 67. The ferromagnetic core means 64 together with the member 61, which is also of ferromagnetic material, together comprise magnetic circuit means which may be made of laminated construction consisting of a plurality of plates for eddy current minimization purposes or such members may be constructed of suitable ferromagnetic materials such as ferrites or the like or other finely divided magnetic material in suitable carrier or binder material. The core means 64 includes a variable portion comprising an air gap 68 (best shown in FIG. 10) between spaced opposed pole pieces 69 on each side of the variable or air gap portion 68 of the complete magnetic circuit.

The magnetic circuit, as previously mentioned, includes the rotatable ferromagnetic shaft-carried member 61 which effectively defines a reluctance-varying means positioned adjacent to at least a part of the variable portion or air gap 68 of the magnetic circuit, with said reluctance-varying means being mounted for movement into a reluctance-minimizing and impedance-maximizing position such as shown in FIG. 11 from a reluctance-maximizing and impedance-minimizing position such as shown in FIG. 10, and into any position therebetween, whereby to correspondingly vary the reluctance of the variable portion or air gap 68 of the magnetic circuit and to correspondingly inversely vary the reactance and, therefore, the impedance produced in the winding means or coil means 65 carried by the ferromagnetic core means 64, and to correspondingly inversely vary and control the current flowing through the winding or coil means 65. This will also correspondingly vary the current flowing through the lamp means 70.

The rotatable ferromagnetic reluctance-varying member 61 is normally adapted to lie in the position shown in FIG. 9 when the switch means 50 is in the open position shown in FIGS. 3 and 4. Thereafter, rotation of the actuating knob 53 in a clockwise direction, as viewed from the top, will cause the cam 51 to close the switch 50, as best shown in FIG. 4A, when the reluctance-varying member is in the position shown in FIG. 10 wherein the impedance of the windings or coil 65 is extremely low so that maximum current will flow through the lamp 70 producing maximum light. Subsequently, the actuating knob 53 can be further rotated toward the extreme position shown in FIG. 11 where the impedance is maximized and the current flowing to the lamp 70 is minimized, thus also minimizing the light produced by the lamp 70.

Preferably the lower surface of the ferromagnetic member 61 lies in a plane immediately above the top surfaces of the two pole pieces 69 for sliding contact therewith when in the position shown in FIG. 11. This is facilitated by reason of the fact that the pole piece means 69 and corresponding underneath portions of the ferromagnetic member 61, are highly polished and have a minimum of clearance whereby to provide a smooth non-shattering contact between the ferromagnetic member 61 and the pole piece means 69 when moved into the extreme position shown in FIG. 11 which corresponds to maximum reactance and impedance.

In the specific example illustrated, means is provided for limiting the rotative movement of the impedance-varying member 61 when moving in an impedance-maximizing direction toward the extreme position shown in FIG. 11 where the member 61 abuts the stop pin P. This is for the purpose of preventing the switch-actuating cam 51 from riding completely over and off of the top switch member 50A. If desired, a similar additional stop pin may be provided for limiting the opposite movement of the member 61 to the minimum impedance position and switch-off position shown in FIG. 9.

It should be noted that the right wire-engaging means 20B is similar to, and substantially corresponds to a mirror image of, the left wire-engaging means 20A, and corresponding parts are indicated by the same reference numeral with the letter "A" replaced, however, by the letter "B." In view of the fact that the left wire-engaging means 20A has been described in full hereinbefore, it is believed unnecessary to repeat the description in connection with the right wire-engaging means 20B. This is also true of the right support channel means 43B and the right two-wire electrical cord portion 23B and the engagement thereof.

It should be noted that the two threaded advancement members 26A and 26B may be integral with the knobs 27A and 27B, respectively, and in certain instances, the bushings 28A and 28B may be eliminated and the top wall 29 of the upper housing portion 19U may be appropriately threaded or tapped for the direct threaded reception of the threaded advancement means 26A and 26B.

It should also be noted that, in certain instances, the actuating knob 53 may be integrally formed with respect to the shaft 52.

FIG. 13 is very similar to FIG. 12, which is the electrical schematic illustration of the first form of the invention shown in FIGS. 1–11. In this modification, similar parts are indicated by similar reference numerals, primed, however. In FIG. 13 the current-controlling or variable impedance means indicated generally at 67' is of a slightly different form from that indicated at 67 in the first form of the invention and comprises an inductance 65' and a capacitance 71 connected together in parallel and tuned so as to provide a parallel tuned resonant circuit connected in series between the electrical wires 44A' and 44B' whereby to greatly reduce the current flow therethrough to the lamp 70' when said circuit is tuned to the exact frequency of the electric power supplied to the unit. However, detuning said parallel tuned resonant circuit 67' by adjusting either the capacitor 71 or the inductance 65' will greatly increase the amount of current flow therethrough and allow the lamp to produce more light. The switch 50' still operates in substantially the same manner as that described hereinbefore in connection with the first form of the invention. The remainder of the apparatus also operates in a similar fashion.

FIG. 14 is a view generally similar to FIGS. 12 and 13 but illustrates a further slight modification wherein similar parts are indicated by similar reference numerals, doubly primed, however. In this modification, the current-controlling means designated generally by the reference numeral 67″ comprises the coil 65″ and a ferromagnetic member 61″ controllably insertible thereinto, for inductance and impedance varying purposes, by pinion means 72 carried by the shaft means 52″ and in driving engagement with respect to rack means 73 carried by the ferromagnetic member 61″. It will be understood that suitable guide means may also be provided, although such is not shown in the schematic view comprising FIG. 14. The position of the apparatus shown in FIG. 14 is a current-maximizing position. However, counter-clockwise rotation of the shaft 52″ will insert the ferromagnetic member 61″ into the coil 65″ in a manner increasing the impedance and minimizing current flow to the lamp 70″, thus reducing the amount of light produced. The switch 50″ and other elements operate in a manner similar to that described hereinbefore.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

What is claimed is:

1. Electric current control apparatus, comprising: manually controllably operable wire-engaging means for physically and electrically engaging insulated electrical wire means at electrically spaced points; and manually variable current-controlling means effectively connected to said wire-engaging means between at least two of said electrically spaced points for controlling non-steady-state current flow therethrough, said current-controlling means including a variable impedance reactor comprising magnetic circuit means, winding means, a variable magnetic circuit portion, and physically manually controllably movable reluctance-varying means movably mounted adjacent to and in electromagnetically cooperable relationship with respect to said variable magnetic circuit portion for controllable reluctance-varying movement in a manner varying the effective reluctance of said magnetic circuit portion and correspondingly varying the impedance of said reactor.

2. Apparatus of the character defined in claim 1 wherein said wire-engaging means comprises manually operable advancement means and abutment means carried at the forward end thereof and provided with piercing electric contact point means for piercing penetrating advancement through insulation of the insulated electrical wire means into electrically conductive means therein whereby to make electrical engagement therewith.

3. Apparatus of the character defined in claim 2, wherein said wire-engaging means also includes wire-support means receiving the insulated electrical wire means and retaining it in a piercing position firmly supported in closely spaced relationship with respect to said piercing point means.

4. Electric current control apparatus, comprising: a housing provided with manually controllably operable wire-engaging means for physically and electrically engaging insulated electrical wire means at electrically spaced points; and manually adjustable, variable impedance, current-controlling means positioned within said housing and effectively connected in series with said wire-engaging means and said electrically spaced points for controlling alternating current flow therethrough, said current-controlling means including a variable impedance reactor comprising magnetic circuit means, winding means, a variable magnetic circuit portion, and physically manually controllably movable reluctance-varying means movably mounted adjacent to and in electromagnetically cooperable relationship with respect to said variable magnetic circuit portion for controllable reluctance-varying movement in a manner varying the effective reluctance of said magnetic circuit portion and correspondingly varying the impedance of said reactor.

5. Apparatus of the character defined in claim 4, wherein said wire-engaging means comprises manually operable advancement means and abutment means carried at the forward end thereof and provided with piercing electric contact point means for piercing penetrating advancement through insulation of the insulated electrical wire means into electrically conductive means therein whereby to make electrical engagement therewith.

6. Apparatus of the character defined in claim 5, wherein said wire-engaging means also includes wire-support means receiving the insulated electrical wire means and retaining it in a piercing position firmly supported in closely spaced relationship with respect to said piercing point means.

7. Electric current control apparatus, comprising: physically separated first and second manually controllably operable wire-engaging means for physically and electrically engaging two different portions of insulated electrical wire means; and control-of-energization switch means and manually variable current-controlling means effectively connected between said first and second wire-engaging means for controlling non-steady-state current flow therethrough, said current-controlling means including a variable impedance reactor comprising magnetic circuit means, winding means, a variable magnetic circuit portion, and physically manually controllably movable reluctance-varying means movably mounted adjacent to and in electromagnetically cooperable relationship with respect to said variable magnetic circuit portion for controllable reluctance-varying movement in a manner varying the effective reluctance of said magnetic circuit portion and correspondingly varying the impedance of said reactor.

8. Apparatus of the character defined in claim 7, wherein each of said wire-engaging means comprises manually operable advancement means and abutment means carried at the forward end thereof and provided with piercing electric contact point means for piercing penetrating advancement through the insulation of the corresponding portion of the insulated electrical wire means into electrically conductive means therein whereby to make electrical engagement therewith.

9. Apparatus of the character defined in claim 8, wherein each of said wire-engaging means also includes wire-guiding channel means receiving the corresponding portion of the insulated electrical wire means and retaining it in a piercing position firmly supported in closely spaced relationship with respect to said piercing point means.

10. Electric current control apparatus, comprising: a housing provided with physically separated first and second manually controllably operable wire-engaging means for physically and electrically engaging two different portions of insulated electrical wire means; and coupled control-of-energization switch means and manually adjustable, variable impedance, current-controlling means positioned within said housing and effectively connected between said first and second wire-engaging means for controlling alternating current flow therethrough, said current-controlling means including a variable impedance reactor comprising magnetic circuit means, winding means, a variable magnetic circuit portion, and physically manually controllably movable reluctance-varying means movably mounted adjacent to and in electromagnetically cooperable relationship with respect to said variable magnetic circuit portion for controllable reluctance-varying movement in a manner varying the effective reluctance of said magnetic circuit portion and correspondingly varying the impedance of said reactor.

11. Apparatus of the character defined in claim 10, wherein each of said wire-engaging means comprises manually operable threaded advancement means and abutment means carried at the forward end thereof and provided with a pair of piercing electric contact point means for piercing penetrating advancement through the insulation of the corresponding portion of the insulated electrical wire means into electrically conductive means therein whereby to make electrical engagement therewith.

12. Apparatus of the character defined in claim 11, wherein each of said wire-engaging means also includes wire-guiding inwardly converging support channel means in each end of said housing receiving the corresponding portion of the insulated electrical wire means and retaining it in a piercing position firmly supported in closely spaced relationship with respect to said piercing point means and on the opposite surface thereof from that adjacent to said piercing point means.

References Cited by the Examiner
UNITED STATES PATENTS

| | | | |
|---|---|---|---|
| 2,706,225 | 4/55 | Freeman | 307—114 X |
| 2,742,593 | 4/56 | Voss | 307—114 X |
| 2,910,625 | 10/59 | Carpenter | 307—114 X |

LLOYD McCOLLUM, *Primary Examiner.*

MILTON O. HIRSHFIELD, *Examiner.*